United States Patent
Ito et al.

[19]

[11] Patent Number: 5,881,032
[45] Date of Patent: *Mar. 9, 1999

[54] OPTICAL DISK, AND OPTICAL DISK REPRODUCTION METHOD AND APPARATUS IMPLEMENTING A MATHEMATICAL COMPLEMENTARY RELATIONSHIP FOR PLURAL LAYERS

[75] Inventors: Motoshi Ito; Yoshihisa Fukushima, both of Osaka; Hiroshi Ueda, Hirakata, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 899,663

[22] Filed: Jul. 24, 1997

Related U.S. Application Data

[62] Division of Ser. No. 733,774, Oct. 18, 1996, abandoned.

[30] Foreign Application Priority Data

Oct. 19, 1995 [JP] Japan ..................................... 7-270833

[51] Int. Cl.[6] ....................................... G11B 7/00
[52] U.S. Cl. ............................ 369/32; 369/275.3; 369/94
[58] Field of Search ........................... 369/58, 32, 275.3, 369/94, 286

[56] References Cited

U.S. PATENT DOCUMENTS

| | | |
|---|---|---|
| 4,450,553 | 5/1984 | Holster et al. . |
| 5,253,242 | 10/1993 | Satoh et al. ............................ 369/44.37 |
| 5,406,534 | 4/1995 | Hisakado et al. ..................... 369/44.37 |
| 5,418,774 | 5/1995 | O'Hara et al. ........................ 369/275.3 |
| 5,488,593 | 1/1996 | Furumiya et al. .................... 369/44.26 |
| 5,563,855 | 10/1996 | Nakase et al. ............................. 369/32 |
| 5,656,348 | 8/1997 | Kudo et al. ........................... 369/275.3 |
| 5,694,387 | 12/1997 | Gotoh et al. .......................... 369/275.3 |

FOREIGN PATENT DOCUMENTS

| | | |
|---|---|---|
| 0517490 | 12/1992 | European Pat. Off. . |
| 715301 | 6/1996 | European Pat. Off. . |
| 1-109571 | 4/1989 | Japan . |
| 2-103732 | 4/1990 | Japan . |
| 4-69857 | 3/1992 | Japan . |
| 6150564 | 5/1994 | Japan . |
| 6236555 | 8/1994 | Japan . |
| 793766 | 4/1995 | Japan . |
| 7-141783 | 6/1995 | Japan . |
| 9609624 | 3/1996 | WIPO . |

*Primary Examiner*—Nabil Hindi
*Attorney, Agent, or Firm*—Wenderoth, Lind & Ponack, L.L.P.

[57] ABSTRACT

An optical disk has a first recording layer and a second recording layers placed one over the other in such a manner that information recorded in each layer is optically readable from one side of the disk. Tracks are formed on the first and second recording layers with a plurality of sectors provided along the tracks. The tracks on the first and second layers are in a spiral pattern and arranged such that the spiral patterns on the first and second layers have opposite winding directions when viewed from the same side of the disk. The sector addresses provided to the first recording layer increasing from the most inside circumference to the most outside circumference, and the sector addresses provided to the second recording layer increase from the most outside circumference to the most inside circumference. The sector addresses on the first and second layers in approximately corresponding places in the radial direction of the disk are in complementary relationship.

14 Claims, 11 Drawing Sheets

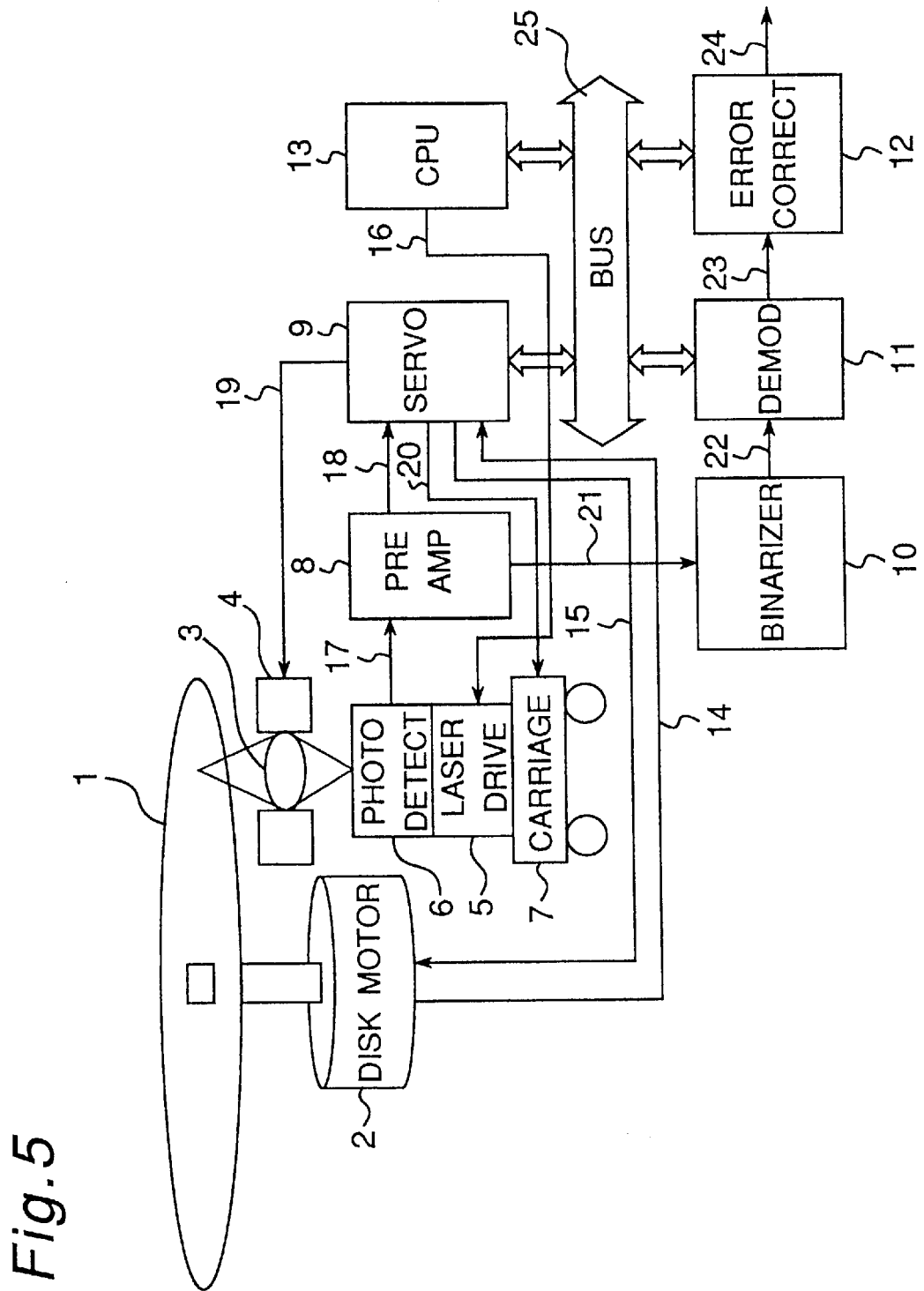

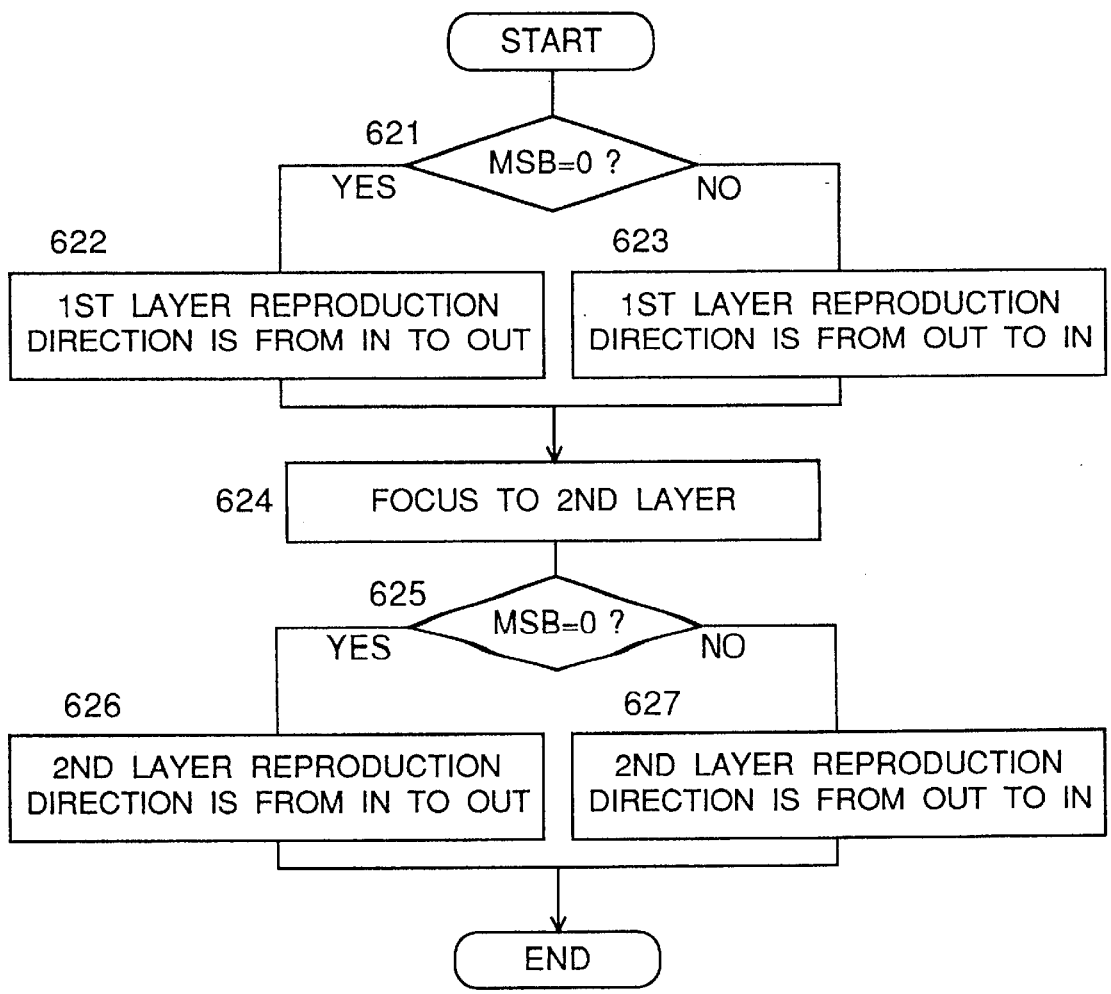

OPTICAL DISK, AND OPTICAL DISK REPRODUCTION METHOD AND APPARATUS IMPLEMENTING A MATHEMATICAL COMPLEMENTARY RELATIONSHIP FOR PLURAL LAYERS

This is a divisional application of Ser. No. 08/733,774, filed Oct. 18, 1996.

BACKGROUND OF THE INVENTION

1. Field of the Invention

The present invention relates to an information storage medium comprising plural information storage layers in a single disk-shaped information storage medium, an information reproducing method for reproducing data in sector units from the information storage medium, and an information reproducing apparatus implementing the information reproducing method.

2. Description of the Prior Art

Conventional optical disks have only one recording layer, and no consideration has been given for optical disks having plural recording layers. Magnetic storage media, however, typically have plural recording layers on each magnetic disk. The structure of such a magnetic storage media is shown in FIG. 9.

A magnetic disk typically has plural disk-shaped magnetic storage media D1 and D2, and magnetic read/write heads M1, M2, M3 and M4 for four recording surfaces. The magnetic read/write heads M1, M2, M3 and M4 are provided at the end of swing arms A1, A2, A3 and A4 which are rotated simultaneously by the stepping motor. This makes it possible to change the read/write recording surface by simply selecting the appropriate magnetic head. Plural concentric tracks are formed on each recording surface, and each track is divided into plural sectors. Each of these sectors typically has a 512-byte to 2048-byte capacity, and is used as the data recording unit. An address comprising the track number and sector number (also referred to as sector address) is written to the beginning of each sector. The magnetic disk drive depends on this address information to position the magnetic head. Track numbers are assigned in ascending order from the outside circumference to the inside circumference.

On a conventional optical disk, however, the recording track is formed as a spiral groove rather than concentric grooves. Except that the track shape is spiral, the track numbers and sector numbers of optical disk media standardized for data processing (e.g., 90 mm magneto-optical disks conforming to ISO-10090) are assigned in the same manner as on a magnetic disk.

The sector addresses on optical disk media developed first for audio storage and later adapted for data processing applications, i.e., CD-ROMs, are expressed in minutes, seconds, and frames.

To maximize the disk storage capacity of a CD-ROM or other optical disk, the recording density is constant across the entire disk surface. The disk is also driven with constant linear velocity (CLV) control to assure that a constant data quantity is reproduced per unit of time. CLV drive rotates the disk at a variable speed depending upon the radial disk position so that the beam spot focused on the disk by the optical head scans a constant distance per unit of time on the disk. Disks containing a constant recording density across the entire disk surface are therefore also known as CLV disks.

The sector arrangement on a CLV disk is shown in FIG. 10. Each fan-shaped block in FIG. 10 is a sector. The sectors are contiguously connected in a spiral pattern. Because the recording density is constant, every sector is the same size (capacity) from an inside to an outside circumference.

The internal structure of each sector is shown in FIG. 11. Each sector thus comprises a header containing the address uniquely identifying the sector, a data block to which user data is recorded, and an error correction code (ECC) block to which is recorded a code used for error correction during reproduction.

Advances in moving picture compression technologies in recent years have also made it possible to record substantially theater-quality moving pictures to a single optical disk. These disks are known as Digital Video Disks (DVD).

A single DVD can store approximately 135 minutes of high-quality moving pictures. Obviously, however, not all video sources are approximately 135 minutes long. It has therefore been proposed that the storage capacity could be approximately doubled by forming two recording layers on a single optical disk. The principle of reproducing data from a dual recording layer optical disk is shown in FIG. 12 and described below.

Strings of pits and lands are formed in a transparent substrate, which is then coated with aluminum, to form each recording layer. A transparent photosetting resin is injected between the first and second recording layers. The thickness of the aluminum on the first recording layer is adjusted to reflect half and pass half of the light incident thereon. The thickness of the aluminum on the second recording layer is adjusted to reflect all of the light incident thereon. The beam spot (focusing point) of the laser beam can be focused on the aluminum of the first or second recording layer by moving the objective lens that focuses the laser beam closer to or away from the optical disk.

The recording layers of the DVD medium are described below. As with conventional optical disks and magnetic disks, information is divided into sector units for recording to a DVD medium. The DVD sector arrangement of each recording layer is also like that of the CLV disk shown in FIG. 10. The internal structure of each sector is also the same as that of a conventional information storage medium as shown in FIG. 11.

FIGS. 13A, 13B, 13C and 13D show the spiral grooves of a conventional information storage medium having two recording layers as described above, the rotational velocity, and the reproduction direction. FIG. 13A shows the spiral groove pattern on the first layer, FIG. 13B shows the spiral groove pattern on the second layer, FIG. 13C shows the rotational velocity of the disk, and FIG. 13D shows the reproduction direction. User data is recorded to the data blocks of the first and second layers as shown in FIG. 13D. The sector address is also recorded to the lead-in and lead-out areas (shown shaded in the FIG. 13D) so that the current position can be determined when the head overruns the data block.

When the information storage medium is rotated clockwise, both first and second recording layers are reproduced from the inside circumference to the outside circumference. The rotational velocity of the information storage medium is also inversely proportional to the radius, and therefore the rotational velocity decreases as the head moves from inside circumference to outside circumference. Thus, if reproduction is to continue from the first layer to the second layer, the head must be moved from the outside circumference to the inside circumference while simultaneously adjusting the rotational velocity of the medium.

When the information storage medium has two or more recording layers, there are two factors that must be considered when assigning the sector addresses. First, every address must be unique throughout the information storage medium. If the same address exists on the first and second layers, it is not possible to determine from the address alone whether the desired information is recorded on the first or second recording layer. Second, the addresses assigned to each layer should be easily convertible to an address on the first layer. This is because the address is the location information, and to move to the desired sector the movement distance must be calculated from the address. Particularly in a CLV information storage medium, the number of sectors per disk revolution is proportional to the radial position of the sector, and the sector number counted from the disk center is proportional to the surface area to the radial position of the sector. In other words, the groove number is in a square root relationship to the address of the sector counted from the disk center.

Apparatuses for reproducing a CLV disk must be able to calculate this square root in order to obtain the number of grooves the head must cross in order to be positioned to the desired sector. If converting the addresses on each layer to an address on the first layer is difficult, a different square root must be calculated for each layer.

Optical disk media standards generally define median and deviation values for the groove pitch and the radius of the groove closest to the inside circumference. Therefore, if the address at the inside circumference is indefinite relative to the radius of the inside circumference groove, the number of variables in the calculation obtaining the above square root increases. Thus, when the address at the inside circumference of each layer is indefinite, the time and tables required to calculate the square root increase. As a result, apparatuses for reproducing such disks incur cost increases from the square root tables required, and an increase in the processing time needed to calculate the square roots.

Conventionally, there has been proposed an optical disk having a plurality of recording layers to increase the recording capacity per one storage medium. Such an optical disk uses opposite side faces of the information storage medium, as in the case of the magnetic disk. One example is disclosed in Japanese Laid-open Patent Publication No. H2-103732. This reference discloses that the spiral track on the first side and that on the second side are in opposite direction for enabling smooth continuous play from the first side to the second side.

However, all the conventional optical disks of the two recording layer type has the recording surfaces facing in opposite directions, and both surfaces have the same reflectivity. Thus, one optical head is provided on each side, thus in total two optical heads in one reproducing apparatus. The optical head is an expensive device, because it generally includes a semi-conductor laser generator for the light source, optical devices for adjusting the light intensity, and an electromagnetic coil for adjusting the focusing point. Therefore, the reproducing apparatus used in connection with the conventional optical disk of the two recording layer type is normally a high cost apparatus.

Since there are two separate optical heads for the first and second sides of the optical disk, the first optical head for the first side surface may be located at the outer most track, whereas the second optical head for the second side surface may be located at the inner most track. Also, according to the recent development in the technology, which is called a jitter free reproduction technology, the reproduction can be properly carried out even when the disk rotation speed deviates from its proper speed. Therefore, in order to accomplish the smooth contiguous play from the first side to the second side, there is no limitation for the conventional two recording layer type optical disk to use a reproducing apparatus that moves the first head from an inside position to an outside position and then the second head from the outside position to the inside position, or vice versa, i.e., the first head from the outside position to the inside position and then the second head from the inside position to the outside position. It is possible that the first head may reproduce from the inside position to the outside position, and then the second head may reproduce from the inside position to the outside position.

Also, according to the conventional optical disk of the two recording layer type, since two separate optical heads are necessary it is possible to use the same addresses between the first side and the second side.

As understood from the above, according to the conventional two recording layer type optical disk, no consideration has been made to enable the smooth contiguous play from the first side to the second side using only one optical head. For the conventional two recording layer type optical disk, a plurality of optical heads are provided for enabling smooth contiguous play from the first side to the second side. Alternatively, one way to solve this drawback is to move the heads instantaneously from inside to outside, or vice versa, and at the same time change the rotational speed of the disk. However, from a practical view point, such an apparatus is not realized.

A problem with the conventional information storage medium thus described is that the groove formation and addresses are determined without considering contiguous reproduction across plural recording layers. As a result, a loss of performance and an increase in cost are incurred in apparatuses for reproducing such information storage media.

SUMMARY OF THE INVENTION

To resolve the aforementioned problems, the present invention provides an information storage medium comprising plural recording layers wherein the spiral reproduction directions are opposite on even and odd-numbered layers. In addition, the addresses assigned to sectors at the same radial positions on even and odd-numbered layers are numbers in a complementary relationship.

An information reproducing method according to the present invention for reproducing data in sector units from an information storage medium having plural recording layers comprises a direction-of-spiral recognition step for recognizing the spiral direction of each layer, an address conversion step assigning contiguous logical space across plural layers in an information storage medium in which numbers in a complementary relationship are assigned as the addresses of sectors at the same radial positions on even and odd-numbered layers, and a movement distance calculation step for obtaining the access distance to a particular address.

An information reproducing apparatus according to the present invention for reproducing data in sector units from an information storage medium having plural recording layers comprises a direction-of-spiral recognition means for recognizing the spiral direction on each layer, an address conversion means for assigning contiguous logical space across plural layers on an information storage medium in which numbers in a complementary relationship are assigned as the addresses of sectors at the same radial positions on even and odd-numbered layers, and a movement distance calculation means for obtaining the access distance to a particular address.

According to one aspect of the present invention, an optical disk comprises:

at least first and second recording layers placed one over the other in such a manner that information recorded in each layer is optically readable from one side of the disk;

tracks formed on the first and second recording layers with a plurality of sectors provided along the tracks, the tracks on the first and second layers being in a spiral pattern and arranged such that the spiral patterns on the first and second layers have opposite winding directions when viewed from the same side of the disk.

According to another aspect of the present invention, an optical disk comprises:

at least first and second recording layers placed one over the other in such a manner that information recorded in each layer is optically readable from one side of the disk;

tracks formed on the first and second recording layers with a plurality of sectors provided along the tracks;

sector addresses provided to the sectors, respectively, the sector addresses on the first recording layer increasing from one circumference side to another circumference side, the one circumference side being either one of the most inside circumference and the most outside circumference, and the other circumference side being other one of the most inside circumference and the most outside circumference, and the sector addresses on the second recording layer increasing from the other circumference side to the one circumference side;

the sector address on one layer and the sector address on the other layer, which are allocated to sectors in the tracks approximately corresponding to each other, being in complementary relationship.

According to yet another aspect of the present invention, an optical disk reproduction method for reproducing an optical disk having:

at least first and second recording layers placed one over the other in such a manner that information recorded in each layer is optically readable from one side of the disk;

tracks formed on the first and second recording layers with a plurality of sectors provided along the tracks;

sector addresses provided to the sectors, respectively, the sector addresses on the first recording layer increasing from one circumference side to another circumference side, the one circumference side being either one of the most inside circumference and the most outside circumference, and the other circumference side being other one of the most inside circumference and the most outside circumference, and the sector addresses on the second recording layer increasing from the other circumference side to the one circumference side;

the sector address on one layer and the sector address in the on the other layer, which are allocated to sectors tracks approximately corresponding to each other, being in complementary relationship, the method comprises the steps of:

detecting ascending direction of the sector address on the optical disk;

moving an optical head unit to a target position on the layer; and reproducing the disk in a direction detected by the detecting step.

According to a further aspect of the present invention, an optical disk reproduction method for reproducing an optical disk having:

at least first and second recording layers placed one over the other in such a manner that information recorded in each layer is optically readable from one side of the disk;

tracks formed on the first and second recording layers with a plurality of sectors provided along the tracks;

sector addresses provided to the sectors, respectively, the sector addresses on the first recording layer increasing from one circumference side to another circumference side, the one circumference side being either one of the most inside circumference and the most outside circumference, and the other circumference side being other one of the most inside circumference and the most outside circumference, and the sector addresses on the second recording layer increasing from the other circumference side to the one circumference side;

the sector address on one layer and the sector address on the other layer, which are allocated to sectors in the tracks approximately corresponding to each other, being in complementary relationship, the method comprises the steps of:

detecting an address of a current section to which the optical head unit is focused;

detecting the number of the recording layer to which the optical head unit is focused; and converting the detected address, when the detected number of the recording layer is the second, to contiguous logical space which is in common with the address of the first recording layer.

According to a still further aspect of the present invention, an optical disk reproduction apparatus for reproducing an optical disk having:

at least first and second recording layers placed one over the other in such a manner that information recorded in each layer is optically readable from one side of the disk; tracks formed on the first and second recording layers with a plurality of sectors provided along the tracks;

sector addresses provided to the sectors, respectively, the sector addresses on the first recording layer increasing from one circumference side to another circumference side, the one circumference side being either one of the most inside circumference and the most outside circumference, and the other circumference side being other one of the most inside circumference and the most outside circumference, and the sector addresses on the second recording layer increasing from the other circumference side to the one circumference side;

the sector address on one layer and the sector address on the other layer, which are allocated to sectors in the tracks approximately corresponding to each other, being in complementary relationship, the apparatus comprises:

means for detecting ascending direction of the sector address on the optical disk;

means for moving an optical head unit to a target position on the layer; and reproducing the disk in a direction detected by the detecting means.

According to another aspect of the present invention, an optical disk reproduction apparatus for reproducing an optical disk having:

at least first and second recording layers placed one over the other in such a manner that information recorded in each layer is optically readable from one side of the disk;

tracks formed on the first and second recording layers with a plurality of sectors provided along the tracks;

sector addresses provided to the sectors, respectively, the sector addresses on the first recording layer increasing from one circumference side to another circumference side, the one circumference side being either one of the most inside circumference and the most outside circumference, and the other circumference side being other one of the most inside circumference and the most outside circumference, and the sector addresses on the second recording layer increasing from the other circumference side to the one circumference side;

the sector address on one layer and the sector address on the other layer, which are allocated to sectors in the tracks approximately corresponding to each other, being in complementary relationship, the apparatus comprises:

means for detecting an address of a current sector to which the optical head unit is focused;

means for detecting the number of the recording layer to which the optical head unit is focused: and means for converting the detected address, when the detected number of the recording layer is the second, to contiguous logical space which is in common with the address of the first recording layer.

BRIEF DESCRIPTION OF THE DRAWINGS

The present invention will become more fully understood from the detailed description given below and the accompanying diagrams wherein:

FIG. 5 is a block diagram of an information reproducing apparatus according to the third embodiment of the present invention;

FIG. 6B is a flow chart showing a modification of the flow chart shown in FIG. 6A;

DESCRIPTION OF PREFERRED EMBODIMENTS

It is therefore possible by means of the configuration described above to provide an information storage medium from which information can be contiguously reproduced across plural recording layers. In each recording layer of an information storage medium having plural recording layers, the address of each sector in layer Ln (where $n \leq 2$) is obtained from a logic operation containing a complementary operation on the address assigned to the sector at the same radial position in the first layer. Data reproducing operations from contiguous sector units spanning plural recording layers thus reproduce data in increasing sector number sequence.

It is also possible to provide an information reproducing apparatus capable of recognizing the reproduction direction of the spiral recording patterns on an information storage medium comprising plural recording layers. When the reproduction directions of the spiral recording patterns on different recording layers of the information storage medium differ, it is also possible for the information reproducing apparatus to create contiguous logical space spanning plural recording layers, and access any desired address on the information storage medium.

As a result, it is possible to provide at low cost and high performance information reproducing apparatus capable of contiguously reproducing data from plural recording layers.

The preferred embodiment of an information storage medium according to the present invention is described below with reference to the accompanying figures.

Figure 1A:
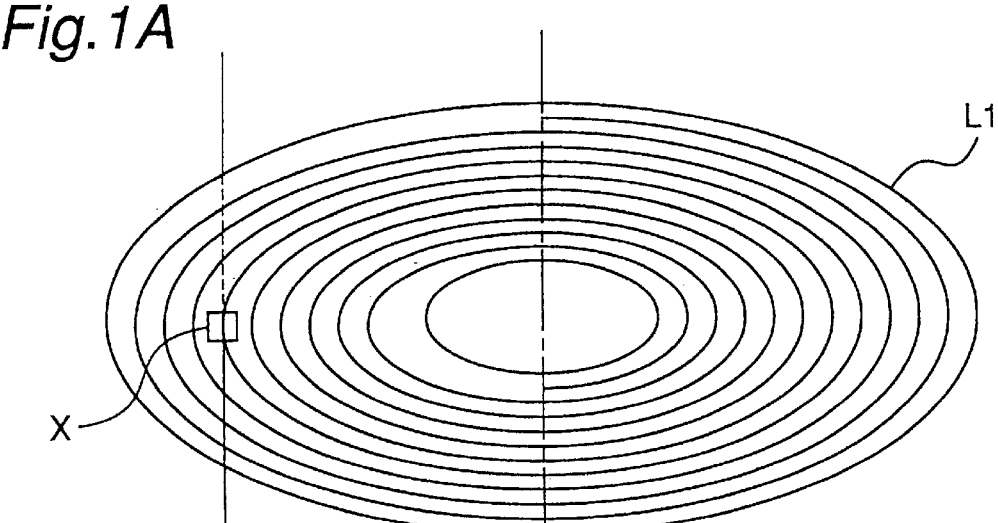
FIGS. 1A and 1B show spiral grooves in two recording layers according to the present invention.
Figure 1B:
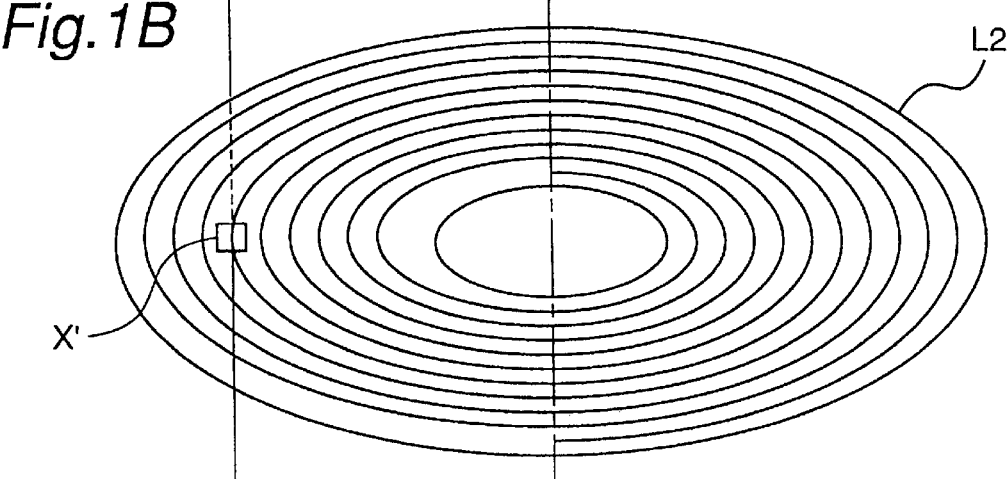
Figure 1C:
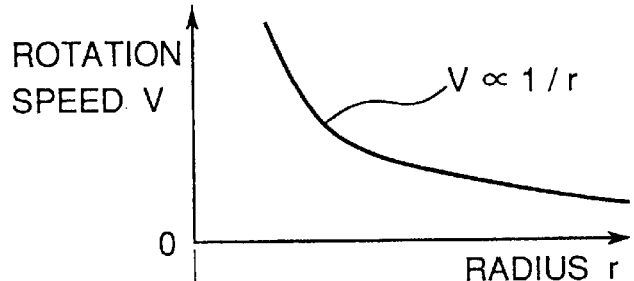
FIG. 1C is a graph showing a rotational velocity.
Figure 1D:
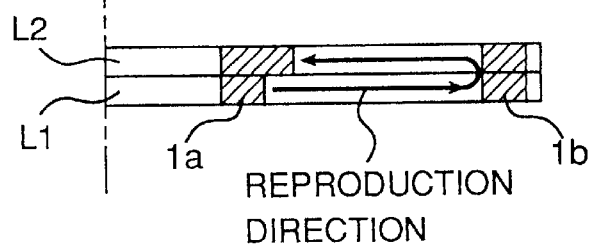
FIG. 1D is a diagram showing reproduction directions of an information storage medium comprising two recording layers according to a first embodiment of the present invention.
Figure 13A:
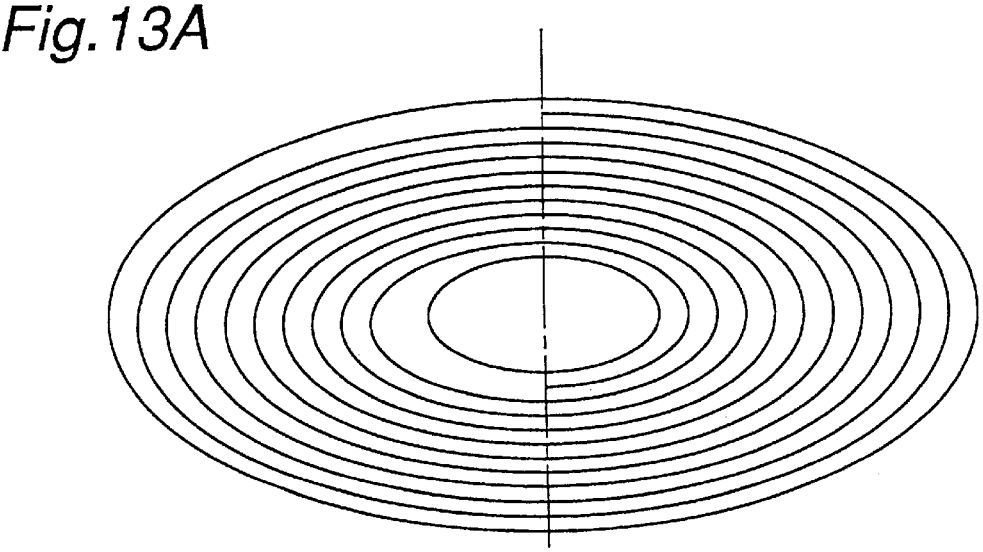
FIGS. 13A and 13B show spiral grooves in two recording layers according to the prior art.
Figure 13B:
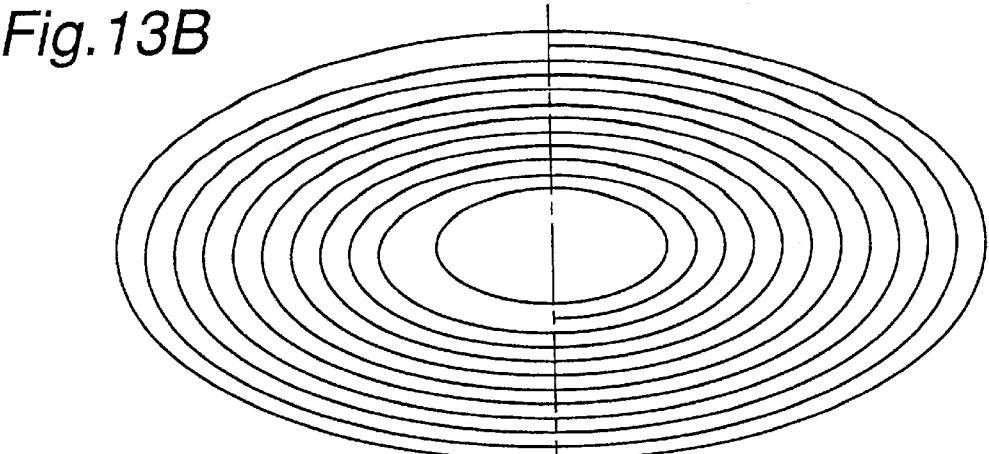
Figure 13C:
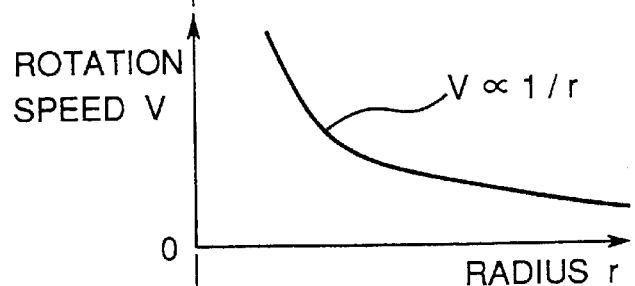
FIG. 13C is a graph showing a rotational velocity.
Figure 13D:
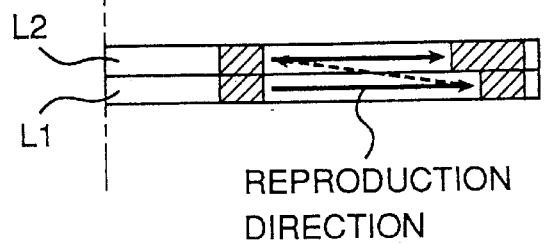
FIG. 13D is a diagram showing reproduction directions of an information storage medium comprising two recording layers according to the prior art.

FIGS. 1A, 1B, 1C and 1D) show, respectively, spiral grooves on first and second layers L1 and L2, rotational velocity, and reproduction directions of an information storage medium, i.e., an optical disk. The optical disk according to the first embodiment of the present invention comprises first and second recording layers L1 and L2. FIG. 1A shows the spiral groove pattern on the first layer L1, FIG. 1B shows the spiral groove pattern on the second layer L2, FIG. 1C shows the rotational velocity of the disk, and FIG. 1D shows the reproduction direction. User data is recorded to the data blocks of the first and second layers L1 and L2 as shown in FIG. 1D. The sector address is also recorded to the lead-in area 1a and lead-out area 1b, as shown in FIG. 13D, so that the current position can be determined when the head overruns the data block.

The first feature of the present invention is that the sector address X on the first layer L1 and the sector address X' on the second layer L2 are in the complementary relationship with each other. Ideally, the sectors addresses X and X' are opposing to each other, but for the purpose of the present invention, the sector addresses X and X' are in the tracks of the same number of turns counted from the most inner track, or in vicinity of such tracks. Two major advantages provided by the first feature are as follows.

The first advantage is that a contiguous logical space at the outer (or inner) most sector address of the first layer and that of the second layer can be obtained. This is explained in detail in connection with FIG. 7A.

The second advantage is that the rate of change of the sector address in the first layer and that in the second layer are in a symmetrical relationship about the disk. This is explained in detail in connection with FIG. 8.

When the information storage medium is rotated clockwise, the first recording layer L1 is reproduced from the inside circumference to the outside circumference. With constant linear velocity (CLV) drive control, the rotational velocity of the information storage medium is inversely proportional to the radius as shown in FIG. 1C. Therefore, when the head is positioned at any given radial position on the disk, the rotational velocity is the same on both the first and second layers L1 and L2.

When reproduction is switched from the first layer L1 to the second layer L2 as shown in FIG. 1D, it is not necessary to change the direction of disk rotation when switching from the first to the second layer, and it is not necessary to move the head from the outside circumference to the inside circumference.

Figure 2:
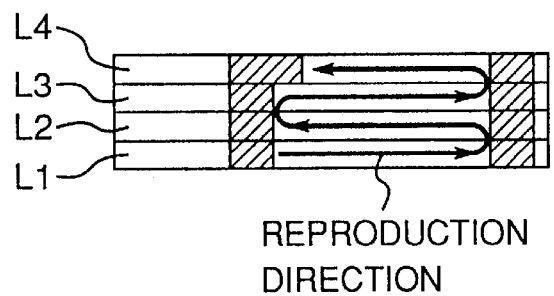
FIG. 2 is a diagram showing reproduction directions on an information storage medium comprising four recording layers according to a first embodiment of the present invention.

FIG. 2 shows the reproduction directions on an information storage medium with four recording layers L1, L2, L3 and L4. The first and third layers L1 and L3 in this example are reproduced from an inside to an outside circumference, and the second and fourth layers L2 and L4 are reproduced from the outside to the inside circumference. As when switching from the first to second recording layers as described above, it is not necessary to change the direction of disk rotation or to move the head when switching from the second to third recording layer, or from the third to fourth recording layer.

When applied to a digital video disk medium to which moving pictures are recorded, the practical effect of this switching method is particularly great because the delay of switching layers is directly related to intermitting the video reproduction.

It is therefore possible, as described above in the first embodiment of the present invention, to provide an information storage medium from which information can be contiguously reproduced across plural recording layers.

Note, however, that if the addressing method used with conventional information storage media is used on information storage media in which the data recording grooves are formed to enable contiguous reproduction from the first to the second layer, the first recording layer will be reproduced in the normal ascending order, but the second recording layer will be reproduced in descending order. Using the minute-second-frame addressing scheme of an audio CD, this would result in the minute, second, and frame values decreasing as reproduction of the title continues on the second recording layer.

In addition, if the address following the address of the last outside circumference sector on the first recording layer is assigned as the address of the first sector at the outside circumference of the second recording layer (the first second-layer sector reproduced after the last first-layer sector is reproduced), all sector addresses on the second layer will be dependent upon the address of the last sector on the first layer, and no second layer sector address can be discretely determined. For example, if the address of the last sector at the outside circumference of the first layer is X, and the address of the second layer sector at the same radial position is X+1, then all second layer sector addresses are dependent on the value of X. Note, further, that the address of the last outside circumference sector is indefinite on audio CDs.

Figure 10:
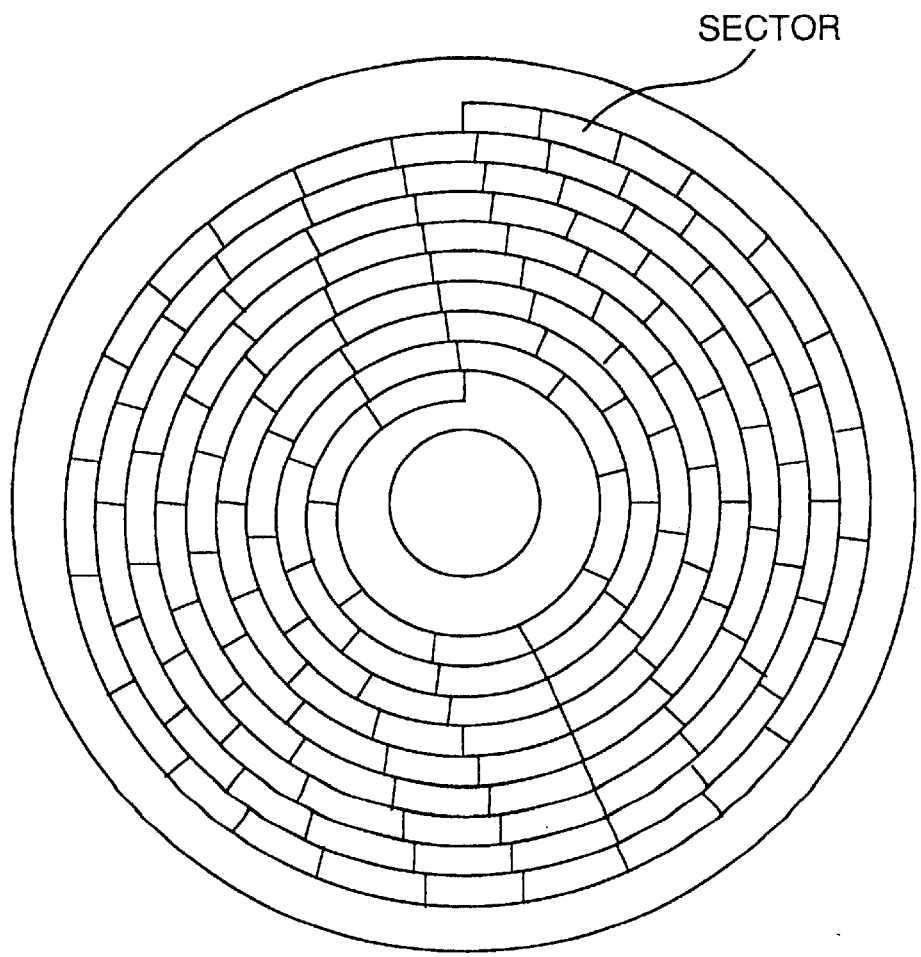
FIG. 10 is a top plan view of a constant linear velocity (CLV) disk.
Figure 11:
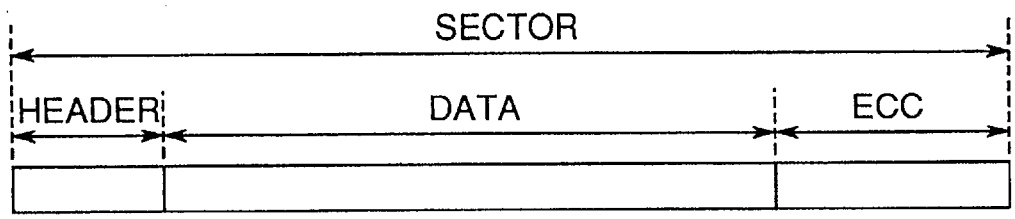
FIG. 11 is a diagram showing internal sector structure of a disk.
Figure 12:
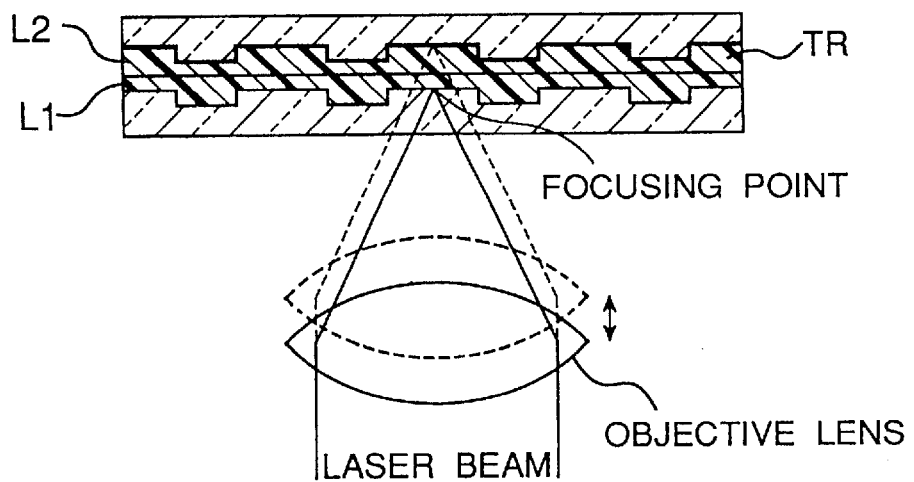
FIG. 12 is a diagram showing an optical disk with two recording layers.

The second feature of the present invention is that the disk has a plurality of recording layers wherein the reproduction directions are opposite on even and odd-numbered layers. Thus, according to the present invention, when the tracks are presented in a spiral pattern, such as shown in FIG. 10, the spiral pattern of the first layer L1 and that of the second layer L2, when viewed from the laser beam source such as shown in FIG. 12, are in opposite direction winding. The spiral pattern shown in FIG. 10 is referred to as having a counterclockwise winding. Thus, it can be said that, when the disk is viewed from the objective lens shown in FIG. 12, the first layer L1 has a counterclockwise winding and the second layer L2 has a clockwise winding. This is also shown in FIGS. 1A and 1B.

The above arrangement, according to the present invention, can be accomplished by preparing two transparent layers, each layer having a pattern similar to that shown in FIG. 10. The difference between the two layers is the specific data recorded along the spiral track. Then, the track engraved surface of one layer is mirror finished, and the track engraved surface of the other layer is half-mirror finished, for example, depositing an aluminum film. Then, as shown in FIG. 12 the two layers are bonded together with the track engraved surfaces facing each other, and photosetting resin TR deposited between the surfaces. Thus, when viewed from one side of the disk, the spiral in one layer has a counterclockwise winding direction and the spiral in the other layer has a clockwise winding direction. This arrangement has the following advantages.

The first advantage is that the reproduction direction of one layer is from an inside to an outside circumference track, and that of the other layer is from the outside to the inside circumference track, or vice versa. Thus, one reciprocal movement, from the inside position to the outside position and from the outside position to the inside position, of the optical head is sufficient to reproduce both layers.

Another advantage is that the same cutting apparatus for cutting the die for molding the layers can be used. As apparent from the above, the first and second layers have the same spiral winding direction when viewed onto the engraved surface. Thus, the cutting apparatus for cutting the die for molding the layers needs to cut the die only in one spiral winding direction.

Figure 3:
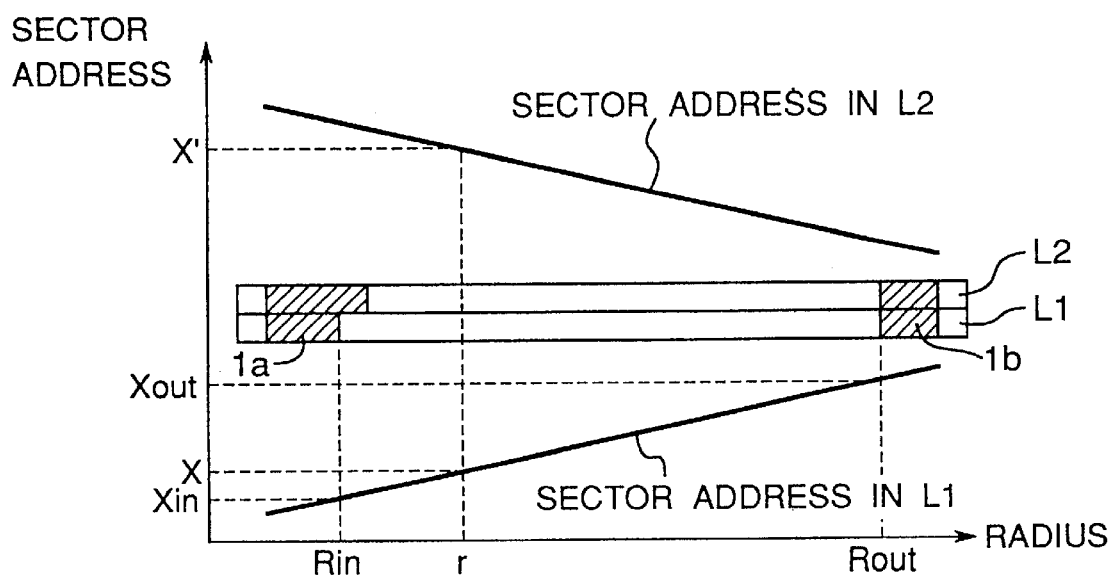
FIG. 3 is a diagram showing a manner for assigning address on an information storage medium comprising two recording layers according to a second embodiment of the present invention.

FIG. 3 shows the method of assigning addresses to a dual layer information storage medium according to a second embodiment of the present invention. In this embodiment the address of a second layer sector is the mathematical complement X' (prime (') indicates complement) of the address X of the first layer sector at the same radial position r. For example, if the address of a given sector in the first layer L1 is 030000h, the sector on the second layer at the same radial position is FCFFFFh (where "h" indicates a hexadecimal numbering system). This can be obtained by the following four steps.

| (1) | | 0 | 3 | 0 | 0 | 0 | 0 | hexadecimal |
|---|---|---|---|---|---|---|---|---|
| (2) | 0000 | 0011 | 0000 | 0000 | 0000 | 0000 | | binary |
| (3) | 1111 | 1100 | 1111 | 1111 | 1111 | 1111 | | bit inverted |
| (4) | | F | C | F | F | F | F | hexadecimal |

Note that the functions of the shaded areas in FIG. 3 are the lead-in area 1a and lead-out area 1.

In the white area, which is a user data area, between the lead-in and lead-out areas 1a and 1b on the first layer, the address of the sector at radius Rin at the inside circumference of the first layer is assumed to be Xin in this example and the address of the sector at radius Rout at the outside circumference is Xout, where Xin<Xout. The first layer sector addresses are assigned in ascending order from an inside circumference to an outside circumference, and by assigning the complement of the first layer sector address at the same radial position as the second layer sector address, the second layer sector addresses are assigned in ascending order from the outside to the inside circumference. As a result, when data is reproduced from each sector in the reproduction direction shown in FIG. 1D, the sector addresses continue in ascending order from the first layer to the second layer, as will be explained later with reference to FIG. 7A.

When the information storage medium has four recording layers, sectors on the respective layers can be addressed by simply adding a high bit indicating whether the addressed sector is on the first or second return in the reproduction direction shown in FIG. 2.

Figure 4:
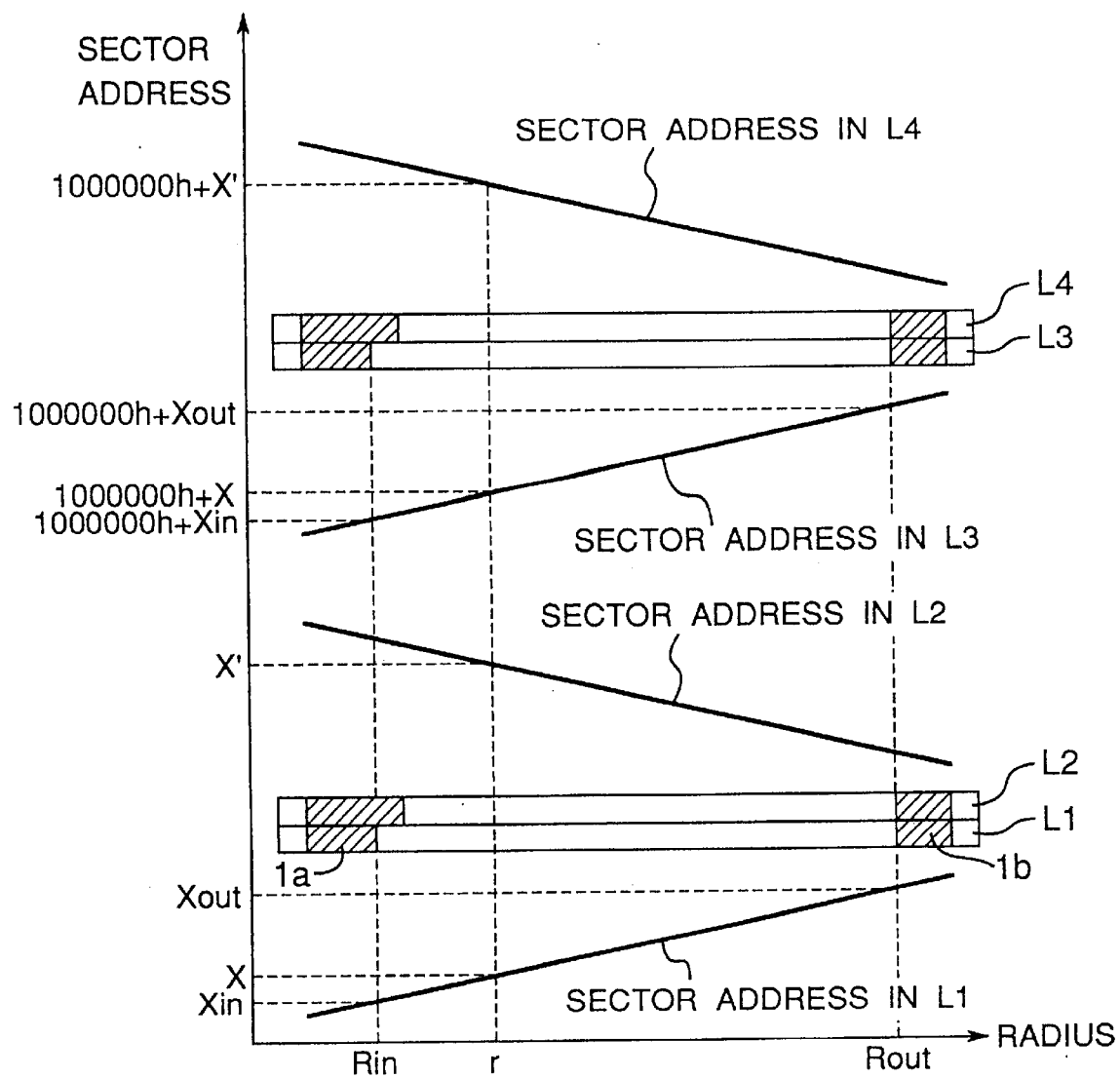
FIG. 4 is a diagram showing a manner for assigning address on an information storage medium comprising four recording layers according to a second embodiment of the present invention.

FIG. 4 shows the addressing method of an information storage medium comprising four recording layers L1, L2, L3 and L4 according to a second embodiment of the invention. With this method, the sector addresses on the second, third, and fourth layers at the same radial position as the sector at address 0030000h on the first layer are 0FCFFFFh, 1030000h, and 1FCFFFFh, respectively.

When data is read from sectors written in the reproduction direction shown in FIG. 2, the sector addresses thus continue to rise in ascending order from the first through the fourth layers. As a result, the bit indicating the first or second return in the reproduction direction and the most significant bit (MSB) of the rest of the address will be 00b, 01b, 10b, and 11b (where "b" indicates a binary value), respectively, for every sector on the first, second, third, and fourth layers. It is therefore possible to identify in which recording layer each sector resides by reading these two bits.

In an information storage medium comprising plural recording layers according to the second embodiment of the present invention as thus described, the address of each sector on layer Ln (where n≧2) is obtained by means of a logic operation including a complementary operation on the address assigned to the first layer sector at the same radial position. As a result, data reproduced in sector units from sectors contiguously addressed across plural recording layers will be reproduced in an ascending sector number sequence.

FIG. 5 is a block diagram of an information reproducing apparatus according to a third embodiment of the invention. Shown in FIG. 5 are the optical disk 1, disk drive motor 2, lens 3, actuator 4, laser drive circuit 5, photodetector 6, carriage 7, preamplifier 8, servo circuit 9, binarization circuit 10, demodulation circuit 11, error correction circuit 12, CPU 13, rotation detection signal 14, disk motor drive signal 15, laser drive signal 16, photodetection signal 17, servo error signal 18, actuator drive signal 19, carriage drive signal 20, analog data signal 21, digital data signal 22, demodulated data signal 23, error-corrected data signal 24, and internal bus 25. The lens 3, actuator 4, photodetector 6, laser drive circuit 5 and carriage 7 define an optical head unit.

The CPU 13 controls the overall operation of the information reproducing apparatus according to the control program stored therein via the internal bus 25. Light reflected from the optical disk 1 is converted to a photodetection signal 17 by the photodetector 6, power-adjusted by the pre-amplifier 8, and converted to the servo error signal 18 and analog data signal 21. The analog data signal 21 is then analog/digital (A/D) converted by the binarization circuit 10 to produce the digital data signal 22, which is then demodulated by the demodulation circuit 11 to produce the demodulated data signal 23. The demodulated data signal 23 is then error corrected by the error correction circuit 12, which outputs the error-corrected data signal 24. The servo error signal 18 is fed back by the servo circuit 9 as the actuator drive signal 19 to the actuator 4, and used for focusing and tracking control of the lens 3.

In a DVD-ROM drive used as a CD-ROM drive or similar computer peripheral device, a host interface circuit (not shown in the figures) is also provided to receive the error-corrected data signal 24 from the error correction circuit 12, and communicate data with the host computer (not shown in the figures) via a host interface (SCSI or other, also not shown in the figures). In CD players and DVD players for consumer use, an A/V decoder (not shown in the figures) for expanding the compressed audio and video data is also provided. The error-corrected data signal 24 from the error correction circuit 12 is then applied to this A/V decoder, and the expanded audio and video signals are outputted through the appropriate video terminals (not shown in the figures).

Because the reproduction procedure of the information reproducing apparatus according to this third embodiment of the invention reproduces a dual-layer information storage medium in which the addresses on the first and second layers are mutually complementary, the following three processes are required for reproduction.

(1) Recognize the reproduction direction of the spiral recording pattern on each layer.

(2) Convert the sector addresses to a contiguous logical space across plural layers.

(3) Obtain the movement distance to the desired address on each layer.

Figure 6A:
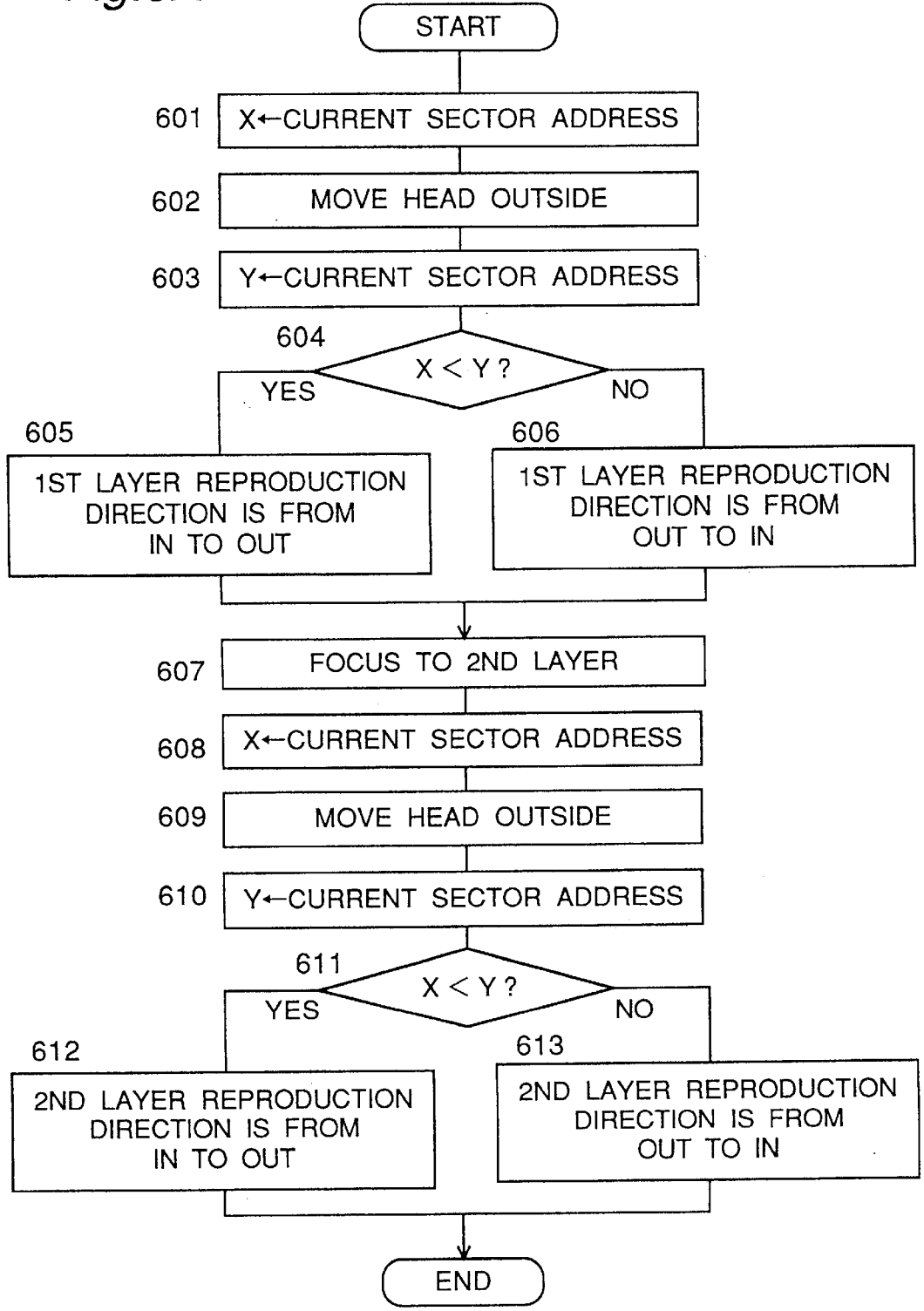
FIG. 6A is a flow chart showing an operation for detecting the spiral reproduction direction of each layer according to the third embodiment of the present invention.

FIG. 6A is a flow chart used to describe the direction-of-spiral recognition means for recognizing the reproduction direction of the spiral recording pattern on each layer according to the third embodiment of the present invention. It is assumed in this example that the sector addresses are sequentially numbered in the order of reproduction, and that the optical head is presently focusing on the first layer.

The first step 601 of this process stores the sector address X of the present position, i.e., the current sector address.

At step 602 the optical head is moved to the outside circumference by a predetermined amount.

Step 603 stores the sector address Y of the present position.

Step 604 compares the addresses X and Y, and branches to step 605 if X<Y, branches to step 606 if not X<Y.

Step 605 determines that the reproduction direction of the first layer is from an inside circumference to an outside circumference.

Step 606 similarly determines that the reproduction direction of the first layer is from an outside circumference to an inside circumference.

At step 607 the servo circuit 9 is instructed to change the focusing position to the second layer.

Step 608 stores the sector address X of the present position.

At step 609 the optical head is moved to the outside circumference by a predetermined amount.

Step 610 stores the sector address Y of the present position.

Step 611 compares the addresses X and Y, and branches to step 612 if X<Y branches to step 613 if not X<Y.

Step 612 determines that the reproduction direction of the first layer is from an inside circumference to an outside circumference.

Step 613 similarly determines that the reproduction direction of the first layer is from an outside circumference to an inside circumference.

FIG. 6B is also a flow chart used to describe the direction-of-spiral recognition means, in a modified manner, for recognizing the reproduction direction of the spiral recording pattern on each layer according to the third embodiment of the present invention. It is assumed in this example that when the direction of the spiral on a given layer is from the inside circumference to the outside circumference, the MSB of the addresses on that layer is 0 due to a complementary relationship between the addresses on the layers, and assumed that the optical head is presently focusing on the first layer. Similarly, when the direction of the spiral on a given layer is from the outside to the inside circumference, the MSB of the addresses on that layer is 1.

The first step 621 of this process evaluates the MSB of the address for the current sector, and branches to step 622 if the MSB is 0, and to step 623 if the MSB is 1.

Step 622 thus determines that the reproduction direction of the first layer is from the inside circumference to the outside circumference.

Step 623 similarly determines that the reproduction direction of the first layer is from the outside circumference to the inside circumference.

At step 624 the servo circuit 9 is instructed to change the focusing position to the second layer.

At step 625 the MSB of the address for the current sector on the second layer is evaluated, and control branches to step 626 if the MSB is 0, and to step 627 if the MSB is 1.

Step 626 thus determines that the reproduction direction of the second layer is from the inside circumference to the outside circumference.

Step 627 similarly determines that the reproduction direction of the second layer is from the outside circumference to the inside circumference.

It is therefore possible by means of the third embodiment of the invention to provide an information reproducing apparatus capable of recognizing the reproduction direction of spiral recording paths on an information storage medium comprising plural recording layers.

After the spiral winding direction is detected, i.e. the ascending direction of the sector address is detected, the optical head is shifted to the target position. Here, the target position is a calculated target position which is slightly different from the operator's requested target position. For example, when the operator's requested target position is at a sector with address 50000h, the calculated target position to which the optical head is actually shifted is 4FFF6h, which is ten (10) sectors retreated from the operator's requested target position. By the detection of the spiral winding direction, the calculation of the sector address located at not an advanced but a retreated position from the operator's requested target position can be accomplished. It is noted that the maximum amount of retreat from the operator's requested target position is about one turn of the track. Thereafter, when the optical head is shifted to the calculated target position, the reproduction is carried out just before the operator's requested target position.

It will be obvious that the invention shall not be limited to the relationship described above between the MSB value of each sector address and the direction of the spiral pattern on each layer, and the same effect can be achieved if an MSB of 1 signifies that the reproduction direction of the spiral pattern is from an inside circumference to an outside circumference, and an MSB of 0 signifies that the reproduction direction of the spiral pattern is from the outside circumference to the inside circumference.

Figure 7A:
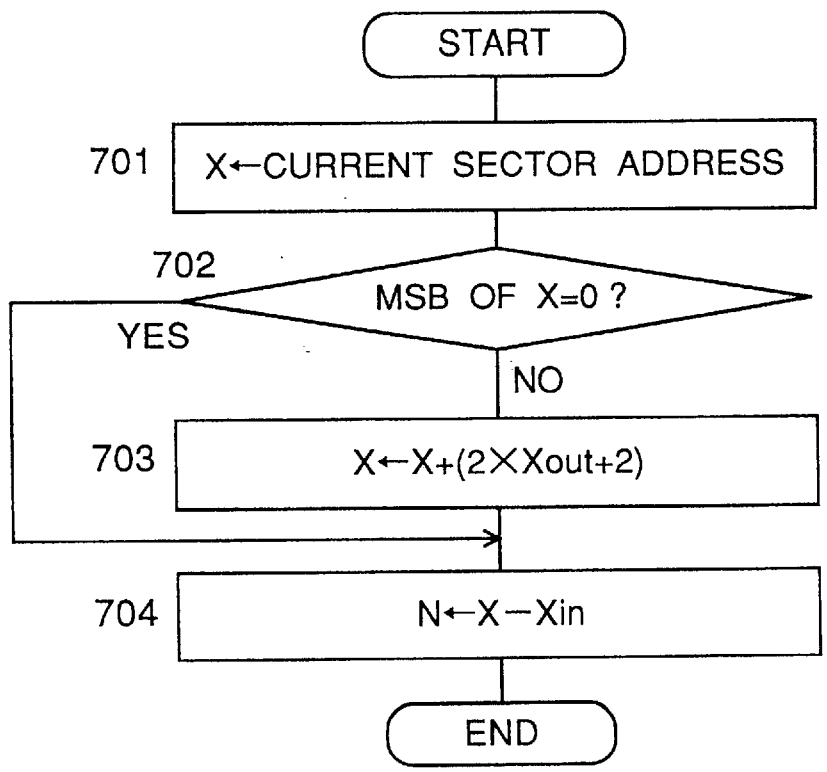
FIG. 7A is a flow chart showing an operation for converting the detected sector address to a contiguous logical space across plural layers according to the fourth embodiment of the present invention.
Figure 7B:
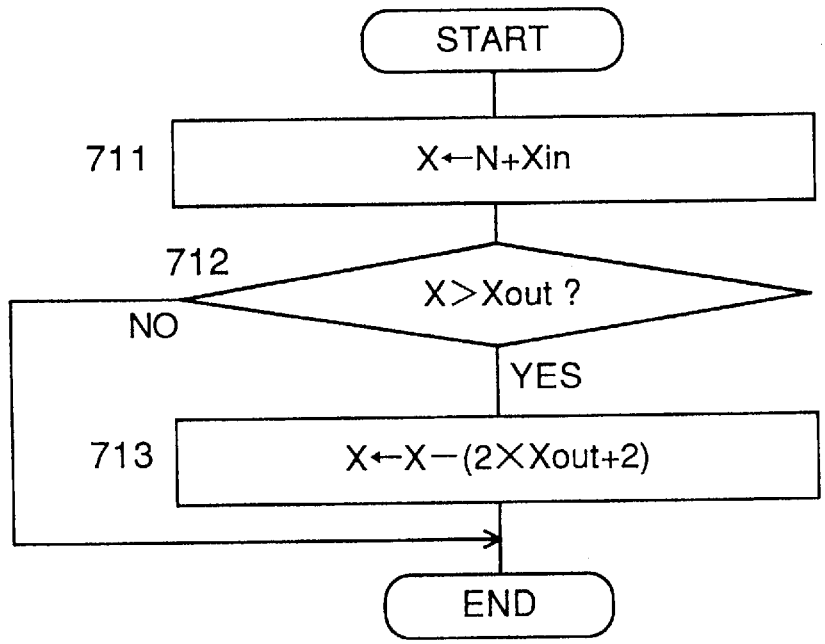
FIG. 7B is a flow chart showing an operation for converting the contiguous logical space to the sector address across plural layers according to the fourth embodiment of the present invention.

FIGS. 7A and 7B are flow charts used to describe the address conversion means for assigning contiguous logical space across plural layers according to the third embodiment of the present invention. In this example as above, when the direction of the spiral on a given layer is from the inside circumference to the outside circumference, the MSB of the addresses on that layer is 0 due to the complementary relationship between the addresses on the layers, and when the direction of the spiral is from the outside to the inside circumference, the MSB of the addresses on that layer is 1.

FIG. 7A is the flow chart for converting from addresses expressed by a variable X on the information storage medium shown in FIG. 3 to a contiguous logical space, i.e., to a sequential value for use in the host computer expressed by a variable N. Here, the variable X represents the actual sector address written on the optical disk and the variable N represents the converted sector address number used in the host computer in the reproducing apparatus. Also, in the calculations shown below, a constant Xout represents an outer most circumference sector address, a constant Xin represents an inner most circumference sector address, and Xout' represents a complement of Xout. The constant Xin is not equal to zero, but is set to a predetermined number, such as 030000h. The constants Xout and Xin are previously stored in the lead-in area of the optical disk, and can be detected by the apparatus upon insertion of the disk.

The first step 701 reads the address of the current sector where the optical head is presently located, and converts the address to a variable X.

The next step 702 evaluates the MSB of variable X, and branches to step 704 if its MSB is 0, and to step 703 if its MSB is 1.

At step 703 the value (2×Xout+2) is added to variable X. (Because −Xout'=Xout+1, X←X−Xout'+Xout+1 is the same as X←X+Xout+1+Xout+1, resulting in a simple calculation).

At step 704 the difference (variable X−Xin) is substituted for variable N.

The variable N, obtained through the flow chart shown in FIG. 7A, becomes a contiguous address value starting from 0 in the white region bounded by the shaded areas in the first and second layers, so that the host computer can regard the disk comprising the two layers as having only one layer with double capacity. In other words, the host computer recognizes the most outside sector address on the first layer and that on the second layer as a consecutive number without any gap or interruption therebetween.

An example of such calculations particularly for the most outside sector addresses Xout and Xout' is given below. It is assumed that, Xin=030000h and Xout=060000h.

Since Xout' is a complement of Xout, Xout' can be calculated by the following equation (1).

$$Xout' = 1000000h - 1 - 060000h = F9FFFFh \tag{1}$$

When the operation is carried out through steps 701, 702 and 704 for processing the address data on the first side, the following calculation (2) is carried out in step 704. It is assumed that the present head position is at Xout.

$$N = Xout - Xin = 060000h - 030000h = 030000h \tag{2}$$

This indicated that the outer most sector address of the first side of the disk is recognized as 030000h in the host computer.

When the operation is carried out through steps 701, 702, 703 and 704 for processing the address data on the second side, the following calculation (3) is carried out in step 704. It is assumed that the present head position is at Xout'.

$$\begin{aligned} N &= Xout' + (2 \times Xout + 2) - Xin \\ &= F9FFFFh + 060000h + 060000h + 2 - 030000h \\ &= FFFFFFh + 060000h + 2 - 030000h \\ &= 105FFFFh + 2 - 030000h \\ &\quad (MSB \text{ of the first term overflows}) \\ &= 060001h - 030000h = 030001h \end{aligned} \tag{3}$$

This indicates that the outer most sector address of the second side of the disk is recognized as 030001h in the host computer. Thus, calculations (2) and (3) indicate that the outer most sector addresses of the first and second sides are recognized as consecutive numbers in the computer, i.e., in the contiguous logical space.

FIG. 7A is the flow-chart for converting from the contiguous logical space expressed by N to a specific sector address expressed by X for the information storage medium shown in FIG. 2.

At step 711 the value (N+Xin) is substituted for variable X.

At step 712 variable X is evaluated, and if greater than Xout, control passes to step 712. Otherwise the process terminates.

At step 713 X is reassigned to the difference (X−(2× Xout+2)).

The values X obtained from the flow chart in FIG. 7B are assigned as the sector addresses of the information storage medium shown in FIG. 3.

It is thus possible as described above according to the third embodiment of the invention to provide an information reproducing apparatus whereby a contiguous logical space spanning plural recording layers can be created on an information storage medium in which the reproduction direction of the spiral pattern differs on alternating layers.

It will be obvious that the invention shall not be limited to the relationship described above between the MSB value of each sector address and the direction of the spiral pattern on each layer, and the same effect can be achieved if an MSB of 1 signifies that the reproduction direction of the spiral pattern is from the inside circumference to the outside circumference, and an MSB of 0 signifies that the reproduction direction of the spiral pattern is from the outside circumference to the inside circumference.

The relationship between the address and the groove position in a CLV medium is described next.

Because the groove width d is constant throughout the information storage medium, the relationship between the radius r and the groove number T counted from the inside circumference is defined by equation (4) below in the first layer;

$$T = (r - Rin)/d \tag{4}$$

Because the recording density is also constant throughout the information storage medium, the areas yielded by the right and left sides of equation (5) are equal in the first layer, wherein r is radius, and (X−Xin) is an address difference between the address Xin at the inside circumference and the present address X;

$$(X - Xin) \times s \times d = \pi \times (r \times r - Rin \times Rin) \tag{5}$$

Here s is the sector length, d is the groove width, and π is pi (the ratio of the circumference of a circle to its diameter). If the radius r is eliminated from equations (4) and (5), the relationship between address X and the groove number T counted from the inside circumference is defined in the first layer by equation (6) below;

$$T = \frac{\sqrt{\frac{(X - Xin) \times s \times d}{\pi} + Rin \times Rin} - Rin}{d} \tag{6}$$

It is noted that equation (5) can be satisfied for the first and second layers only when the rate of change of the sector address in the first layer and that in the second layer are in a symmetrical relationship about the disk, such as shown in FIG. 3. The same rate of change of the sector address in the first layer and that in the second layer can be accomplished by selecting the sector addresses of the first and second layers in complemental relationship with each other.

Figure 8:
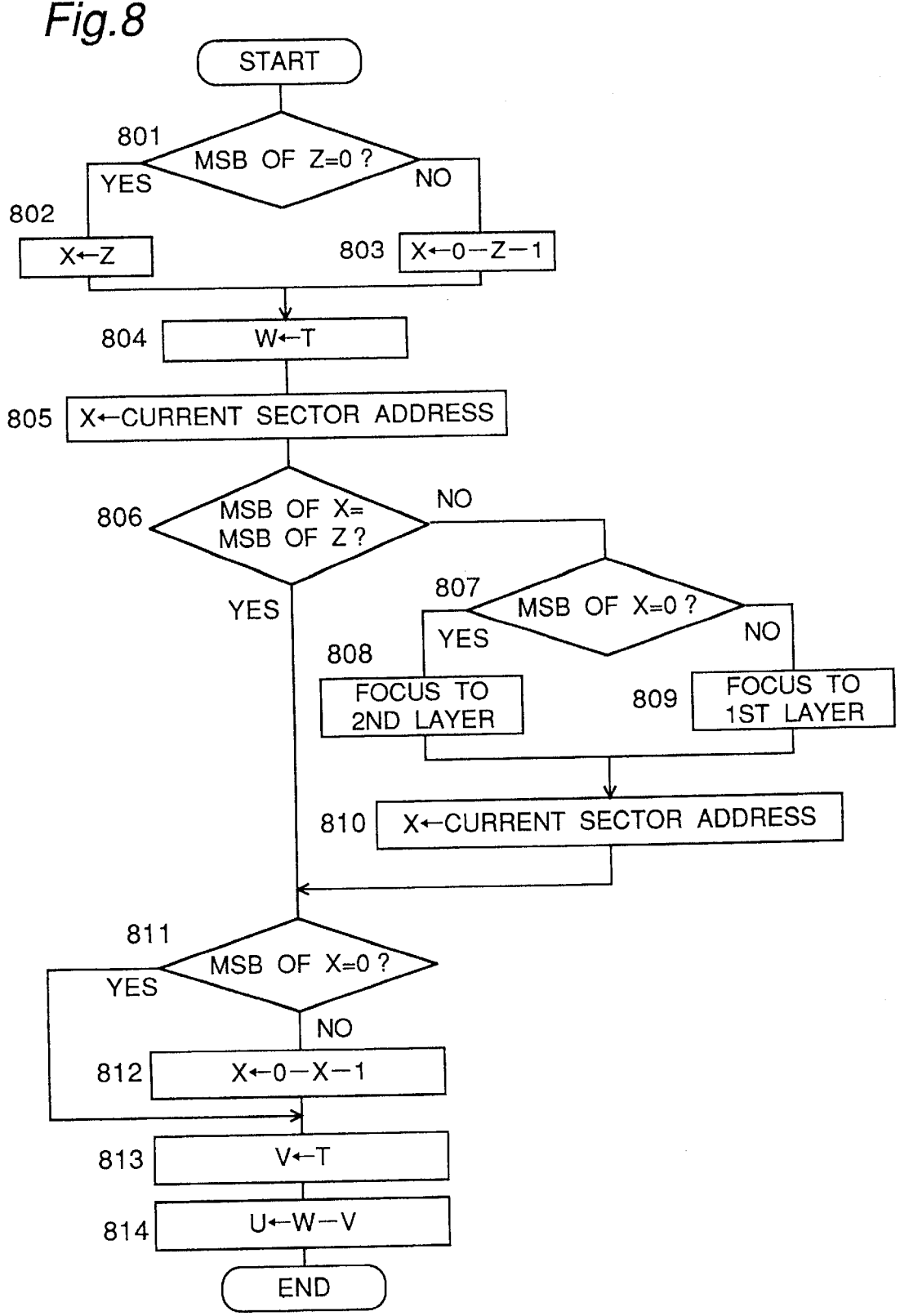
FIG. 8 is a flow chart showing an operation for calculating an amount of move of the optical head for shifting from the current position to a target position.
Figure 9:
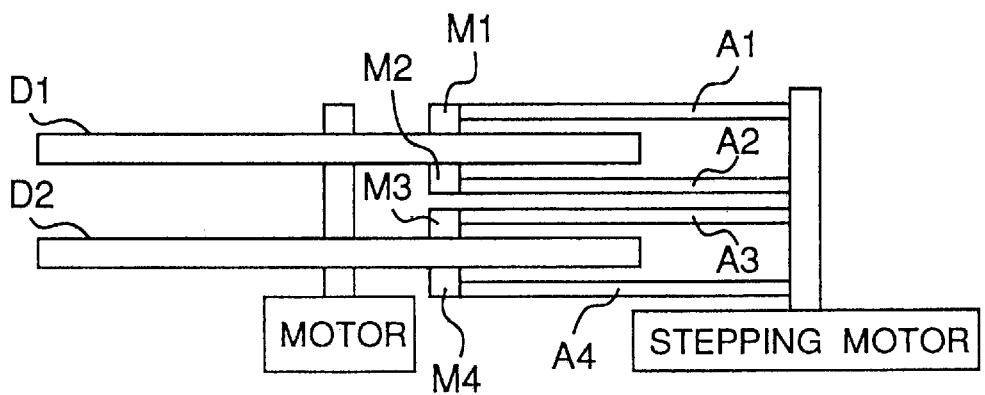
FIG. 9 is a diagram showing a prior art magnetic disk comprising plural recording surfaces.

FIG. 8 is a flow chart used to describe the movement distance calculation means for obtaining the movement distance to a target address according to the third embodiment of the present invention. In this example as above, when the direction of the spiral on a given layer is from the inside circumference to the outside circumference, the MSB of the addresses on that layer is 0, and when the direction of the spiral is from the outside to the inside circumference, the MSB of the addresses on that layer is 1. It is further assumed that the target sector address to which the optical head is to be shifted is calculated in CPU 13 as a variable value Z.

The first step 801 of this process evaluates the MSB of the variable Z, and branches to step 802 if the MSB is 0, and to step 803 if the MSB is 1.

At step 802 Z is substituted for X.

At step 803 the complement of Z is substituted for X.

At step 804 the value T obtained from equation (6) is assigned as the target groove number W (number of grooves counted from the most inside circumference).

At step 805 the address of the current sector is read and defined as variable X.

At step 806 the MSB values of X and Z are compared. If X and Z are equal, the process steps to step 811; otherwise, the process branches to step 807.

If the MSB of the variable X is 0 at step 807, the process branches to step 808 if the MSB is 0, and to step 809 if the MSB is 1.

At step 808 the servo circuit 9 is instructed to move the focusing point to the second layer.

At step 809 the servo circuit 9 is instructed to move the focusing point to the first layer.

At step 810 the address of the current sector is read and assigned to variable X.

If the MSB of X is 0 at step 811, the process branches to step 813 if the MSB is 0, and to step 812 if the MSB is 1.

The complement of X is then substituted for X at step 812.

At step 813 the value T obtained from equation (6) is assigned as the current groove number V.

At step 814 a difference
(target groove number W)–(current groove number V)
is substituted for the to-move groove number U (the number of grooves the magnetic head must move).

It is therefore possible to calculate the groove number of the first and second layers using a common operation by determining from the MSB of the address whether the destination is on the first or second layer, and obtaining the address complement if the destination sector is on the second layer. Methods containing a square root computation, such as in equation (6), may include methods using tables, approximate expressions, and Newton's method of approximation. Regardless of which method is used, however, the size of the program run by the CPU 13 can be reduced and executed at high speed by using complementary addresses so that addresses on plural layers can be obtained using a common operation.

It is therefore possible by means of the third embodiment of the present invention described above to provide an information reproducing apparatus capable of moving to any particular address on an information storage medium in which the reproduction direction of the spiral recording pattern differs on alternating layers.

It will be obvious that the invention shall not be limited to the relationship described above between the MSB value of each sector address and the direction of the spiral pattern on each layer, and the same effect can be achieved if an MSD of 1 signifies that the reproduction direction of the spiral pattern is from the inside circumference to the outside circumference, and an MSB of 0 signifies that the reproduction direction of the spiral pattern is from the outside circumference to the inside circumference.

As described above, an information storage medium capable of contiguous reproduction spanning plural recording layers can be provided.

On each recording layer of an information storage medium comprising plural recording layers, the address of each sector on the $n^{th}$ layer Ln (where $n \geq 2$) is assigned by a logic operation containing a complementary operation on the address of the sector at the same radial position on the first layer. As a result, reproducing data from contiguous sector units spanning plural recording layers reproduces data in an ascending sector number sequence.

It is also possible to provide an information reproducing apparatus capable of recognizing the reproduction direction of the spiral recording patterns on an information storage medium comprising plural recording layers. When the reproduction directions of the spiral recording patterns on different recording layers of the information storage medium differ, it is also possible for the information reproducing apparatus to create contiguous logical space spanning plural recording layers, and access any desired address on the information storage medium.

As a result, it is possible to provide a low cost and high performance information reproducing apparatus contiguously reproducing data from plural recording layers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk comprising:
   first and second recording layers placed one over the other in a manner such that information recorded in each of said first and second recording layers is optically readable from one side of said optical disk;
   tracks formed on said first and second recording layers with a plurality of sectors provided along said tracks; and
   sector addresses provided for said plurality of sectors, respectively, wherein said sector addresses on said first recording layer increase from a first circumference side to a second circumference side, the first circumference side being one of a most inner circumference and a most outer circumference, the second circumference side being the other one of the most inner circumference and addresses outer circumference, and said sector addresses on said second recording layer increasing from the second circumference side to the first circumference side;
   wherein said sector addresses of sectors in said tracks on one recording layer of said first and second recording layers and said sector addresses of approximately corresponding sectors in said tracks on the other recording layer of said first and second recording layers are in a complementary relationship of binary numbers.

2. An optical disk as claimed in claim 1, wherein said tracks on said first and second recording layers are spiral tracks such that a spiral pattern of said first and second recording layers have opposite winding directions when viewed from a same side of said optical disk.

3. An optical disk as claimed in claim 1, wherein said plurality of sectors have substantially a same length whereby said optical disk can be rotated under a constant linear velocity rotational drive control.

4. An optical disk as claimed in claim 1, wherein said first and second recording layers have track engraved surfaces which face each other.

5. An optical disk reproduction method for reproducing an optical disk, the optical disk comprising:
   first and second recording layers placed one over the other in a manner such that information recorded in each of the first and second recording layers is optically readable from one side of the optical disk;
   tracks formed on the first and second recording layers with a plurality of sectors provided along the tracks; and
   sector addresses provided for the plurality of sectors, respectively, wherein the sector addresses on the first recording layer increase from a first circumference side to a second circumference side, the first circumference side being one of a most inner circumference and a most outer circumference, the second circumference side being the other one of the most inner circumference and the most outer circumference, and the sector addresses on the second recording layer increasing from the second circumference side to the first circumference side;
   wherein the sector addresses of sectors in the tracks on one recording layer of the first and second recording layers and the sector addresses of approximately corresponding sectors in the tracks on the other recording layer of the first and second recording layers are in a complementary relationship of binary numbers;
   said optical disk reproduction method comprising:
      detecting an ascending direction of the sector addresses on the optical disk;
      moving an optical head unit to a target position on one of the first and second recording layers; and
      reproducing the optical disk in the ascending direction detected.

6. An optical disk reproduction method as claimed in claim 5, wherein said detecting the ascending direction comprises:

reading a sector address at a first position on the one of the first and second recording layers to which the optical head unit is focused;

moving the optical head unit in a radial direction along the one of the first and second recording layers to which the optical head unit is focused for a predetermined distance;

reading a sector address at a second position on the one of the first and second recording layers to which the optical head unit is focused;

comparing the sector addresses obtained from the first and second positions; and detecting the ascending direction of the sector addresses according to the comparison.

7. An optical disk reproduction method as claimed in claim 5, wherein said detecting the ascending direction comprises:

reading a most significant bit of a sector number to which the optical head unit is focused; and detecting the ascending direction of the sector addresses according to the most significant bit of the sector number read.

8. An optical disk reproduction method for reproducing an optical disk, the optical disk comprising:

first and second recording layers placed one over the other in a manner such that information recorded in each of the first and second recording layers is optically readable from one side of the optical disk;

tracks formed on the first and second recording layers with a plurality of sectors provided along the tracks; and sector addresses provided for the plurality of sectors, respectively, wherein the sector addresses on the first recording layer increase from a first circumference side to a second circumference side, the first circumference side being one of a most inner circumference and a most outer circumference, the second circumference side being the other one of the most inner circumference and the most outer circumference, and the sector addresses on the second recording layer increasing from the second circumference side to the first circumference side;

wherein the sector addresses of sectors in the tracks on one recording layer of the first and second recording layers and the sector addresses of approximately corresponding sectors in the tracks on the other recording layer of the first and second recording layers are in a complementary relationship of binary numbers;

said optical disk reproduction method comprising:

detecting an address of a current sector to which an optical head unit is focused;

detecting a number of one of the first and second recording layers to which the optical head unit is focused; and converting the detected address, when the detected number is the second, to contiguous logical space which is in common with an address of the first recording layer.

9. An optical disk reproduction method as claimed in claim 8, further comprising:

calculating a target sector address to which the optical head is to be shifted;

calculating an amount of distance for shifting the optical head from the current sector address to the target sector address; and shifting the optical head according to the amount of distance calculated.

10. An optical disk reproduction apparatus for reproducing an optical disk, the optical disk comprising:

first and second recording layers placed one over the other in a manner such that information recorded in each of the first and second recording layers is optically readable from one side of the optical disk;

tracks formed on the first and second recording layers with a plurality of sectors provided along the tracks; and sector addresses provided for the plurality of sectors, respectively, wherein the sector addresses on the first recording layer increase from a first circumference side to a second circumference side, the first circumference side being one of a most inner circumference and a most outer circumference, the second circumference side being the other one of the most inner circumference and the most outer circumference, and the sector addresses on the second recording layer increasing from the second circumference side to the first circumference side;

wherein the sector addresses of sectors in the tracks on one recording layer of the first and second recording layers and the sector addresses of approximately corresponding sectors in the tracks on the other recording layer of the first and second recording layers are in a complementary relationship of binary numbers;

said optical disk reproduction apparatus comprising:

means for detecting an ascending direction of the sector addresses on the optical disk;

means for moving an optical head unit to a beginning position on one of the first and second recording layers; and means for reproducing the optical disk in the ascending direction detected by said means for detecting the ascending direction.

11. An optical disk reproduction apparatus as claimed in claim 10, wherein said means for detecting an ascending direction comprises:

means for reading a sector address at a first position on the one of the first and second recording layers to which the optical head unit is focused;

means for moving the optical head unit in a radial direction along the one of the first and second recording layers to which the optical head unit is focused for a predetermined distance;

means for reading a sector address at a second position on the one of the first and second recording layers to which the optical head unit is focused;

means for comparing the sector addresses obtained from the first and second positions; and means for detecting the ascending direction of the sector addresses according to the comparison.

12. An optical disk reproduction apparatus as claimed in claim 10, wherein said means for detecting an ascending direction comprises:

means for reading a recording layer number of the one of the first and second recording layers to which the optical head unit is focused; and means for detecting the ascending direction of the sector addresses according to the recording layer number read.

13. An optical disk reproduction apparatus for reproducing an optical disk, the optical disk comprising:

first and second recording layers placed one over the other in a manner such that information recorded in each of the first and second recording layers is optically readable from one side of the optical disk;

tracks formed on the first and second recording layers with a plurality of sectors provided along the tracks; and sector addresses provided for the plurality of sectors, respectively, wherein the sector addresses on the first recording layer increase from a first circumference side to a second circumference side, the first circumference side being one of a most inner circumference and a most outer circumference, the second circumference side being the other one of the most inner circumference and the most outer circumference, and the sector addresses on the second recording layer increasing from the second circumference side to the first circumference side;

wherein the sector addresses of sectors in the tracks on one recording layer of the first and second recording layers and the sector addresses of approximately corresponding sectors in the tracks on the other recording layer of the first and second recording layers are in a complementary relationship of binary numbers;

said optical disk reproduction apparatus comprising:

means for detecting an address of a current sector to which an optical head unit is focused;

means for detecting a number of one of the first and second recording layers to which the optical head unit is focused; and means for converting the detected address, when the detected number is the second, to contiguous logical space which is in common with an address of the first recording layer.

14. An optical disk reproduction apparatus as claimed in claim 13, further comprising:

means for calculating a target sector address to which the optical head unit is to be shifted;

means for calculating an amount of distance for shifting the optical head unit from the current sector address to the target sector address; and means for shifting the optical head unit according to the amount of distance calculated.

* * * * *

UNITED STATES PATENT AND TRADEMARK OFFICE
CERTIFICATE OF CORRECTION

PATENT NO.   : 5,881,032
DATED        : March 9, 1999
INVENTOR(S)  : Motoshi Ito et al.

It is certified that error appears in the above-identified patent and that said Letters Patent is hereby corrected as shown below:

<u>Column 5,</u>
Line 57, delete "in";
Line 58, delete first occurrence of "the";
Line 59, insert -- in the -- before "tracks".

<u>Column 11,</u>
Line 9, replace "1" with -- 1b --.

<u>Column 18,</u>
Line 11, replace "addresses" with -- the most --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*